United States Patent
Bruning

[15] 3,653,609
[45] Apr. 4, 1972

[54] LIFT STRUCTURE

[72] Inventor: Paul F. Bruning, Altadena, Calif.

[73] Assignee: Electronic Machining Company, Pasadena, Calif.

[22] Filed: Jan. 22, 1970

[21] Appl. No.: 4,796

[52] U.S. Cl..............................244/13, 244/12 CW, 244/41, 244/45
[51] Int. Cl..............................................B64c 3/10
[58] Field of Search......................244/12, 13, 23, 34, 35, 41, 244/45, 48, 40

[56] References Cited

UNITED STATES PATENTS

| | | | |
|---|---|---|---|
| 1,731,348 | 10/1929 | Myers | 244/12 CW |
| 1,787,370 | 12/1930 | Hall | 244/48 |
| 3,152,775 | 10/1964 | Boyd | 244/34 |
| 2,918,233 | 12/1959 | Lippisch | 244/23 B |

*Primary Examiner*—Milton Buchler
*Assistant Examiner*—Steven W. Weinrieb
*Attorney*—Christie, Parker & Hale

[57] ABSTRACT

A lifting body in the general form of approximately a semi-cylinder is connected to the fuselage of an aircraft for providing lift during flight. The lifting surface is substantially free of camber and is concave on its lower face in a direction transverse to the flight direction so that with a small angle of attack a large volume of air is effectively trapped beneath the lifting body, and the side edges minimize loss of air laterally thereby providing lift over substantially all of the lifting surface. The lifting body has a length along the direction of flight greater than the width transverse to the direction of flight for providing a low aspect ratio. Conventional elevators and a rudder are provided for control. In another embodiment the lifting body is formed in a helical shape for acting in the manner of a propeller and in another embodiment a fuselage is integrally connected with the lifting body in an arrangement where the lifting body also has capacity for helium for lighter than air flight.

11 Claims, 4 Drawing Figures

PATENTED APR 4 1972 3,653,609
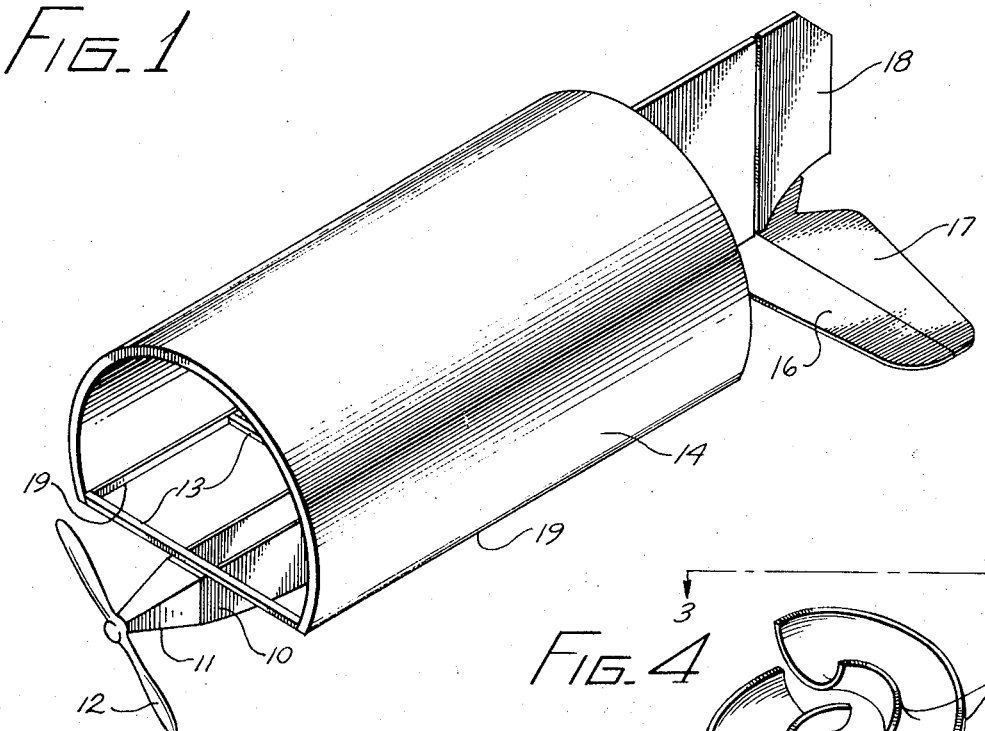
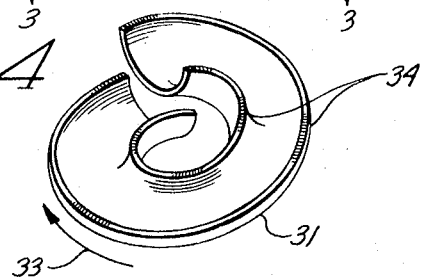
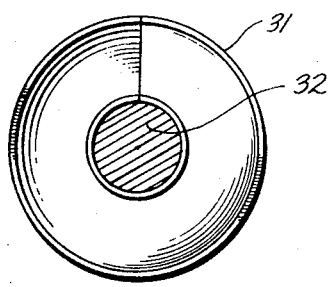
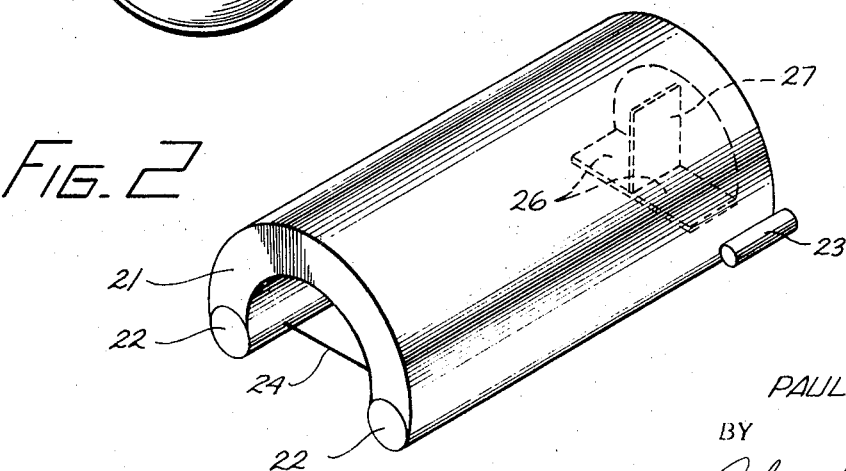
INVENTOR.
PAUL F. BRUNING
BY
Christie, Parker & Hale
ATTORNEYS

LIFT STRUCTURE

BACKGROUND

In aircraft, lift is produced by a difference in pressure below a wing and above a wing with the enhanced pressure below the wing providing an upward force thereon for supporting the aircraft in flight. The difference in pressure above and below the wing is generally formed by a combination of chamber in the wing and an angle of attack wherein the chord of the wing is pitched upwardly relative to the direction of flight. This latter is normally considered as a positive angle of attack. In conventional aircraft there is a substantial amount of tip losses due to air moving laterally from the center beneath the wing, thereby reducing efficiency. The trend has therefore been to long wings giving the aircraft a high aspect ratio with enhanced drag.

It is therefore desirable to produce an aircraft having minimized drag without sacrificing, and even in some cases improving, lift.

BRIEF SUMMARY OF THE INVENTION

Therefore, in practice of this invention according to a preferred embodiment there is provided a lifting body having a length along the direction of flight greater than width transverse to the direction of flight and substantially free of camber. The lifting body is concave on its lower face in a direction transverse to the direction of flight and has side edges lower than the center of the body a distance approximately the same as one-half the distance between the opposite side edges and having the side edges extending substantially the entire length of the lifting body. In a preferred embodiment a fuselage is provided in a position such that the center of gravity of the overall vehicle is at approximately the same elevation as the side edges of the lifting body.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in perspective an airplane constructed according to principles of this invention;

FIG. 2 illustrates an embodiment of this invention in the form of a lighter-than-air craft;

FIG. 3 illustrates a lifting body constructed according to principles of this invention adapted to be employed as a propeller; and FIG. 4 illustrates the propeller of FIG. 2 in perspective.

DESCRIPTION

FIG. 1 illustrates in perspective an airplane constructed according to principles of this invention. As illustrated in this presently preferred embodiment the aircraft has a conventional fuselage 10 having a motor 11 mounted on the front end for driving a conventional propeller 12. These and other conventional aspects of the invention are illustrated somewhat schematically in the drawings since their exact form is not critical to practice of this invention. Connected to the fuselage 10 by a plurality of transverse struts 13 is a lifting body or wing 14. Although illustrated schematically as box-shaped pieces, it will be apparent to one skilled in the art that the struts 13 and other structures encountering air flow are best streamlined on the fore and aft edges for minimizing air resistance.

Mounted on the aft end of the fuselage is a conventional empennage group including a horizontal stabilizer 16 having a movable elevator 17 for control of the angle of attack of the vehicle. A vertical rudder 18 provides for directional control. The control surfaces are preferably large and move through small angles to effect control for minimized drag.

The wing 14 in a preferred embodiment comprises a segment of a right circular cylinder having a length substantially greater than width. The cylinder is open on its bottom side parallel to the cylinder axis so that air can enter the influence of the wing not only at its leading end but also throughout its length. It is preferred that the length of the wing along the direction of flight be greater than about three times the width of the wing in a direction transverse to the direction of flight. If the ratio of the length to width of the wing is less than about 3 to 1, there is an increased loss of air from beneath the wing and the full lift producing capability of the wing is not obtained.

It is of importance that the wing be less than a full cylinder and have side edges 19 extending substantially parallel to the cylinder axis substantially the entire length of the wing for minimizing air losses. Although it is preferred that the wing be in the form of an open semi-cylinder having an arc length of about 180°, it is possible to extend the side edges 19 further around the cylinder to as much as about 45° below the center line without substantially degrading the lift producing capabilities of the wing. If the side edges 19 are brought further down than about 45° an effect similar to a closed cylinder is obtained and insufficient air can enter the region within the nearly enclosed cylinder, and the lifting capability of the wing is degraded.

It is of importance that the wing is not less than about 180° so that minimal loss of air at the sides is avoided. Although the wing is shown as a portion of a right circular cylinder in the illustrative embodiment and this is by far preferred because of the load carrying capabilities of such a uniformly curved structure, it is also possible to construct the wing in the form of a segment of an ellipse or of a polygonal cylinder or the like where instead of a smooth profile the wing is faceted. The making of some of the structural parts required for the wing is simplified in such a structure. When such a structure is employed the preferred arrangement of a wing extending over an arc of 180° may not be considered to be appropriate nomenclature and substantially the same effect is obtained by noting that the side edges 19 of the wing are lower than the center by a distance of approximately the same as one-half the distance between the opposite side edges, i.e., the wing is one-half as high as it is wide.

It will be apparent that since the preferred wing is in the form of a cylinder that there is no camber along the length of the wing. The wing itself must have some thickness in order to provide sufficient structural members internally to support the loads imposed on the wing during flight and therefore streamlining may be provided at the fore and aft edges of the wing in order to minimize drag. In the absence of lift obtained by camber the thickness of the wing need only be sufficient to provide the required structural stiffening and strength. If desired in order to minimize drag the leading edge of the wing can also be swept back somewhat from the center to the side edges.

In order to provide roll stability in the airplane, the center of gravity of the vehicle is preferably lower than the top of the wing a distance approximately the same as one-half the width of the wing. If the fuselage is located so that the center of gravity of the overall vehicle is much higher than this, roll stability must be provided by additional empennage surfaces which tend to increase drag. If the center of gravity is very much below this position the vehicle, if anything, is too stable in roll, and the ability to control the flight path of the vehicle may be impaired. Further, when the center of gravity of the vehicle is located a substantial distance below the center of lift the overall vehicle acts somewhat in the manner of a pendulum and it is found that the best dynamic stability is achieved when the center of gravity of the overall vehicle is below the top of the wing by a distance equal to about one-half the width of the wing. In a preferred embodiment, this places the center of gravity of the vehicle in substantially the same plane as the opposite side edges of the wing. It is also preferred that the vehicle center of gravity be approximately centered fore and aft relative to the wing. This or a position slightly aft of center provides the proper trim for the aircraft.

Lift is obtained by the wing 14 with a very low angle of attack since the wing has a great length in the direction of the line of flight. Adequate lift to support normal flight loads is obtained with a positive angle of attack of substantially less than about 7° with the wing in the form of a segment of the cylinder having a length to width ratio of about three and having the side edges of the wing extending down to about 15° below a semi-cylindrical form, that is, the total arc of the wing is about 210°.

With such an arrangement the drag introduced by the wing is relatively low since the aspect ratio is low and because of the low angle of attack of the vehicle. It is also believed that the drag is minimized due to a minimum of upper wing turbulence since the wing has no appreciable camber. Drag is also minimized since the thickness of the wing is less than that required for conventional wings since there is substantially uniform aerodynamic loading over a large portion of the wing surface and there is no long cantilevered structure that must be supported. The broad side aspect of the wing virtually completely prevents side slipping of the aircraft as may occur in conventional aircraft. Further, there are no problems of torsional rigidity about an axis along the length of the wing as are encountered in conventional wings. These beneficial effects are, to some extent counterbalanced however, due to drag by the struts 13 which must be stiff to carry the lifting load between the fuselage and the wing. In the illustrated embodiment the struts 13 are arranged in the plane of the side edges of the wing, however, this is by no means essential and drag can be somewhat reduced by joining the struts to the wing at a point above the wing edges so that they are in the form of upwardly facing broad V's. Somewhat lighter struts can be used since the bending stresses are slightly lower.

If desired, the same principles of the lift structure can be employed in a vehicle such as illustrated in FIG. 2 which is in the form of an open sided semi-cylinder having a length several times its width. As illustrated in this embodiment a central portion 21 is provided in the form of a large envelope which is filled with helium or the like for providing buoyant lift. Along each side edge of the buoyant central portion 21 is a cylindrical fuselage 22 for carrying cargo and which encompasses the principal structural weight of the vehicle. Small jet engines 23 on the aft ends of the fuselage sections 22 provide power for driving the vehicle through the air. Tension cables 24 between the two fuselage sections 22 are preferably employed for minimizing the structural members required in the central gas containing portion 21 of the vehicle. Movable elevators 26 and a movable rudder 27 provide for attitude and directional control of the vehicle. Roll stability is provided since the overall center of gravity of the vehicle is well below the center of lift.

In employing a vehicle such as illustrated in FIG. 2, the quantity of helium contained in the central region 21 may be sufficient that the overall vehicle is lighter than air, however, in a fully loaded vehicle, a portion of the weight may be supported by the buoyancy of the helium and the balance is supported by the lift provided by forward velocity of the vehicle. Because of the large frontal area of the gas containing volume 21 high air speeds are not feasible with the embodiment illustrated in FIG. 2. High speeds are not, however, necessary for obtaining adequate lift since a portion of the lift is provided by the buoyancy of the helium and high lift is obtained at relatively low speeds and low angle of attack because of the geometry of the semi-cylindrical lifting body.

The same high lift principles can be employed in making a propeller or similar driving member such as illustrated schematically in FIGS. 3 and 4. FIG. 3 is a rear view of such a propeller having a driving member 31 mounted on a shaft 32 and FIG. 4 is a perspective view of the driving member 31 separate from any hub.

The propeller can be considered as one half of a torus cut in a plane normal to its axis and also in a plane parallel to the axis on one side. The "ends" at this latter cut are then displaced so that the semi-torus is distorted into a helical path. Such description is intended as a clarification of the geometry of the driving member and is in no way intended to specify a preferred manner of manufacturing the member.

It will be seen from these views that the driving member 31 is a lifting body incorporating principles of the lifting body 14 of the airplane hereinabove described. As before, the length of the body 31 as it rotates in a direction as indicated by the arrow 33 is several times as great as the width of the body in a direction transverse to the direction of travel. Also, the side edges 34 at any transverse cross section are below the center therebetween by a substantial distance which in a preferred embodiment is approximately one-half the distance between the opposite side edges 34. In this manner the volume of fluid affected by the propeller is maximized.

The illustrated embodiment in FIGS. 3 and 4 is particularly useful in water as a propeller for a boat. In the illustrated embodiment the lifting body 31 extends a full 360° about a shaft and it will be apparent that if desired such a body can be provided with a greater pitch and extend less than 180° around the shaft so that a plurality of such bodies, such as for example three, each extending about 120° can be employed. In such an arrangement the angle of attack of each segment may be greater than the very few degrees angle of attack of either the full turn illustrated in FIG. 4 or an aircraft as illustrated in FIG. 1.

Although only a few embodiments of a lifting body incorporating principles of this invention have been described and illustrated herein, it will be apparent that many modifications and variations can be made by one skilled in the art. Thus, for example, the lifting body may be an under surface of a boat and lift due to flowing air provides a supplement to lift and buoyancy provided by the water. The added lift reduces the wetted area of the boat and reduces water drag. Likewise in an aircraft embodiment the wing provides sufficient lift at low speeds to operate successfully as a glider. This is advantageous in case of loss of power since the aircraft has an excellent glide path and roll stability. It is, therefore, to be understood that within the scope of the appended claims the invention may be practiced otherwise than as specifically described.

I claim:

1. A vehicle comprising:
   a lifting body in the form of an elongated member having a length along the direction of travel greater than width transverse to the direction of travel and being substantially free of camber, the lifting body having an open leading edge and an open trailing edge, the lifting body being convex on one face and concave on the opposite face when viewed in the direction of travel, and having parallel side edges lower than the center of the body a distance of approximately the same as one-half the distance between the opposite side edges, the side edges extending substantially the entire length of the lifting body; and
   a power plant connected to the lifting body for driving the lifting body through a fluid.

2. A lifting body as defined in claim 1 wherein the body is in the form of a segment of a right circular cylinder extending more than about 180° around an arc.

3. A lifting body as defined in claim 2 wherein the length is greater than about three times the width of the lifting body.

4. A combination as defined in claim 1 wherein the lifting body is in the form of a segment of a semi-torus twisted into a helical path.

5. An aircraft comprising:
   a fuselage; and
   a wing located above the fuselage, the wing being in the form of an elongated body having a length along the direction of flight greater than width transverse to the direction of flight and being substantially free of camber, the wing being concave on its lower face, having parallel side edges lower than the center of the wing a distance approximately the same as one-half the distance between the opposite side edges, the side edges extending substantially the entire length of the wing and being located substantially in the same plane as the fuselage and having an open leading edge and an open trailing edge.

6. An aircraft as defined in claim 5 wherein the fuselage is substantially midway between the side edges and the center of gravity of the aircraft is approximately in the same plane as the side edges.

7. An aircraft as defined in claim 5 wherein the fuselage is along one side edge and further comprising:

a second fuselage along the opposite side edge from the first fuselage and wherein the center of gravity of the aircraft is below the center of the wing a distance approximately the same as one-half the distance between the opposite side edges.

8. An aircraft as defined in claim 5 wherein the wing is in the form of approximately a semi-cylinder and wherein the fuselage is substantially on the axis of the semi-cylinder.

9. An aircraft as defined in claim 5 wherein the length of the wing is greater than three times the width of the wing.

10. An aircraft as defined in claim 5 wherein the side edges include a portion extending below the center of the wing more than one-half the distance between the opposite side edges.

11. An aircraft as defined in claim 5 wherein the wing is in the form of a right circular semi-cylinder having a length greater than three times the width and wherein the fuselage is located substantially on the axis of the semi-cylinder and further comprising:

a power plant for driving the aircraft; and
aerodynamic control surfaces.

* * * * *